United States Patent [19]
Maeda et al.

[11] Patent Number: 5,991,261
[45] Date of Patent: Nov. 23, 1999

[54] WRITE INHIBIT TAB FOR DISC CARTRIDGE

[75] Inventors: Keiichi Maeda; Akira Kato, both of Mito, Japan

[73] Assignee: Victor Company of Japan, Ltd., Yokohama, Japan

[21] Appl. No.: 08/988,322

[22] Filed: Dec. 10, 1997

[30]     Foreign Application Priority Data

Dec. 11, 1996  [JP]  Japan ................................. 8-352006

[51] Int. Cl.$^6$ ........................... G11B 23/03; G11B 19/04; G11B 15/16
[52] U.S. Cl. ............................. 369/291; 360/133; 360/60
[58] Field of Search ............................ 369/291; 360/132, 360/133, 60

[56]            References Cited

U.S. PATENT DOCUMENTS

| | | | |
|---|---|---|---|
| 4,536,812 | 8/1985 | Oishi et al. | 360/133 |
| 4,805,061 | 2/1989 | Champagne et al. | 360/133 |
| 4,860,127 | 8/1989 | Takahashi et al. | 360/133 |
| 5,041,923 | 8/1991 | Iwata et al. | 360/133 |
| 5,087,998 | 2/1992 | Oishi | 360/60 |
| 5,121,279 | 6/1992 | Saeki et al. | 360/133 |
| 5,293,293 | 3/1994 | Iwata et al. | 369/291 |
| 5,325,256 | 6/1994 | Miyazaki et al. | 360/133 |
| 5,367,422 | 11/1994 | Fujisawa et al. | 360/133 |
| 5,371,644 | 12/1994 | Hoge et al. | 360/133 |
| 5,539,600 | 7/1996 | Lee et al. | 360/133 |
| 5,748,419 | 5/1998 | Langseth et al. | 369/291 |
| 5,757,764 | 5/1998 | Tanaka | 369/291 |
| 5,805,566 | 9/1998 | Kobayashi | 369/291 |

FOREIGN PATENT DOCUMENTS

| | | | |
|---|---|---|---|
| 63-153779 | 6/1988 | Japan | 369/291 |
| 1-81779 | 5/1989 | Japan . | |
| 2-123580 | 5/1990 | Japan | 369/291 |
| 3-156784 | 7/1991 | Japan . | |
| 5-242626 | 9/1993 | Japan . | |

*Primary Examiner*—David L. Ometz
*Attorney, Agent, or Firm*—Eugene Lieberstein; Michael N. Meller

[57]              ABSTRACT

A disc cartridge 1 for installing a rotary disc has a write inhibit tab 57 which is provided to be slid and indicates a writable or nonwritable status of the disc by its position. The write inhibit tab is comprised of a main body 58, upper and lower slide portions 65 through 68 formed respectively on upper and lower side ends of the main body, groove shaped intermediate slide portions 69 and 70 formed between the upper and lower slide portions, first projections 63 and 64 formed at distal ends of elastic arms extended from the main body, and second projections 71 and 72 formed on the intermediate slide portions. When the write inhibit tab is used for a disc cartridge of an unremovable disc, the upper and lower slide portions and the first projections are used, and when the write inhibit tab is used for a disc cartridge of a removable disc, the intermediate slide portions and the second projections are used.

5 Claims, 20 Drawing Sheets

WRITE INHIBIT TAB FOR DISC CARTRIDGE

BACKGROUND OF THE INVENTION

1. Field of the Invention

The present invention relates to a write inhibit tab of a disc cartridge for protecting stored data by inhibiting to write, and particularly, to the write inhibit tab of the disc cartridge which is provided for both of disc cartridges of a removable disc and an unremovable disc.

2. Description of the Related Art

A disc cartridge for holding a disc, such as a photo-disc, has a write inhibit tab indicating whether the disc may be written or not. FIG. 1 shows a disc cartridge used for the prior art.

In FIG. 1, the disc cartridge 1 is comprised of upper and lower cases 2 and 3, which are integral with each other. A recording medium of a disc shape (not shown) is rotatably held in the disc cartridge 1. Each of the upper and the lower cases 2 and 3 has a spindle hole 4 and a head window 5, through which an optical beam emitted from an optical pick-up (not shown) irradiates the disc. When the disc is not operated, the spindle hole 4 and the head window 5 are closed by a shutter 6 for preventing the disc from dust or touching. The disc cartridge 1 cannot unload (remove) a disc, because it has no open-close shutter for loading and unloading the disc from the disc cartridge.

When the disc cartridge 1 is installed in a disc driving system, the shutter 6 is slid in the arrow indicated direction for disclosing the spindle hole 4 and the head window 5, then a center hole (not shown) of the disc and a part of the recording medium are exposed.

The write inhibit tab 7 is assembled to the disc cartridge 1 for detecting whether the disc may be written or not. The upper case 2 has a check hole 8 of ellipse, and the lower case 3 also has a check hole 9 of ellipse, positions of which correspond with each other.

FIG. 2 shows a perspective view of a write inhibit tab 7 of the prior art. The write inhibit tab 7 of the prior art is comprised of a main body 10, a column 11, slide parts 12 and 13 of the respective sides of the main body 10. The main body 10 has a small hole 14. The main body 10 further has two elastic juts 15 and 16 extending parallel with each other. At the ends of the elastic juts 15 and 16, there are formed projections 17 and 18.

FIG. 3 shows a magnified view of a holder 19 formed on the lower case 3. The disc cartridge 1 has the holder 19 which is provided for holding and allowing the write inhibit tab 7 to slide in the arrow indicated direction as shown in FIG. 3. FIG. 4 is a perspective view of the holder 19. The holder 19 is comprised of first, second and third walls 20, 21, and 22. The first and the second walls 20 and 21 are formed in parallel, and have slits 23 and 24 respectively for engaging with the projections 17 and 18. The third wall 22 restricts the movement of the write inhibit tab 7. The write inhibit tab 7 is inserted to the holder 19 from the upper direction thereof, as shown in FIG. 4. The write inhibit tab 7 is installed in the disc cartridge 1 by assembling the upper and the lower cases 2 and 3 as one body. The column 11 is inserted to the check hole 9, and the small hole 14 on the main body 10 is visible through the cheek hole 8 of the upper case 2. A vertical movement of the write inhibit tab 7 is restricted by the upper and the lower cases 2 and 3.

The write inhibit tab 7 is displaced manually by inserting a pin into the small hole 14 through the check hole 8 and moving it. The write inhibit tab 7 is tentatively positioned by engaging the projections 17, 18 with the slits 23, 24 or upper ends of the walls 20, 21, as shown in FIG. 3. When the disc cartridge 1 is loaded on a disc drive system, the disc drive system senses the position of the write inhibit tab 7 by a sensing device such as a photo-sensor or a mechanical sensor, and discriminates whether data writing on the disc is possible or not.

Some of the disc cartridges have open-close shutters coordinated with loading and unloading of a disc in disc drive systems. FIG. 5 shows a plan view of the disc cartridge 27 having such an open-close shutter 25. A write inhibit tab of a disc cartridge 27 having the open-close shutter 25 is installed in the shutter 25, for allowing loading and unloading of the disc. A support area 26 of arched shape for supporting an under side of the disc edge, an elastic protrusion 28 for engaging the open-close shutter 25 with a body of the disc cartridge 27, a front cover 29, and a holder 30 for installing the write inhibit tab 7 therein are formed on the open-close shutter 25. The open-close shutter 25 is rotatably supported by a hinge 31. When closed the open-close shutter 25 is contained within the disc cartridge 27 except the front cover 29 which is exposed.

FIGS. 6 and 7 show magnified partial views of the holder 30. The holder 30 has first, second and third walls 20, 21 and 22. Slits 23 and 24 are formed on the first and the second walls 20 and 21 respectively. An elliptical check hole 37 is formed on the open-close shutter 25. The disc cartridge 27 has check holes 8 and 9 on the upper case 2 and the lower case 3 respectively corresponding with an elliptical check hole 37, as shown in FIG. 5. The write inhibit tab 7 is installed in the holder 30 from the upper direction of the open-close shutter 25. When the open-close shutter 25 is contained in the disc cartridge 27, the vertical movement of the write inhibit tab 7 is restricted, which is same to the case of the disc cartridge 1 shown in FIGS. 1 through 4. The write inhibit tab 7 may be displaced manually by inserting a pin into the small hole 14 through the check hole 8 of the upper case 2 and by manually moving it. When the disc cartridge 27 is loaded on a disc drive system, the disc drive system senses the position of the write inhibit tab 7 by a sensing device, and discriminates whether data writing on the disc is possible or not.

As mentioned before, the write inhibit tab 7 of the disc cartridge 27 is installed in the holder 30 from the upper direction of the open-close shutter 25, as shown in FIG. 7. When the open-close shutter 25 is opened for removing a disc from the disc cartridge 27, the write inhibit tab 7 has no restriction in its vertical direction, which may cause that the write inhibit tab 7 may change its position, or may drop therefrom. In this case, the position of the write inhibit tab 7 may change from "writable" to "nonwritable", then, the stored data of the disc which is reloaded thereon may be erased erroneously.

In order to solve the problem, it is conceivable that structures of the write inhibit tab 7 and the holder 30 are changed so as to prevent the movement or drop of the write inhibit tab 7, when the open-close shutter 25 is open. To change the structures of the write inhibit tab 7 and the holder 30 means that they could be used interchangeable with the disc cartridges having no open-close shutter 25, and further means increase of the number of parts of the disc cartridge, of the number of dies for producing the parts and of the production cost.

SUMMARY OF THE INVENTION

Accordingly, it is a general object of the present invention to provide a write inhibit tab of a disc cartridge, which indicates writable or nonwritable, for both of a disc cartridge having no open-close shutter and a disk cartridge having an open-close shutter.

It is another and specific object of the present invention to provide a write inhibit tab of a disc cartridge, which is applicable to both of the disc cartridge having no open-close shutter and the disc cartridge having the open-close shutter, and does not change the position or does not drop off.

It is a feature of the present invention to provide a write inhibit tab for indicating writable or nonwritable, the write inhibit tab is comprised of a main body, first slide portions formed respectively on an upper and a lower side ends of the main body, second slide portions formed between the upper and lower slide portions of the first slide portions, first projections having elasticity formed on ends of arms which are extended from the main body, and second projections formed on the second slide portions.

It is another feature of the present invention to provide a disc cartridge for containing a rotary disc of recording medium and having a write inhibit tab which is formed to displace and indicates writable or nonwritable by its position, the disc cartridge is comprised of the write inhibit tab having a main body, first side portions formed respectively on an upper and a lower side ends of the main body, second slide portions formed between the upper and lower portions of the first slide portions, first projections formed on ends of arms which are extended from the main body and has elasticity, second projections formed on the second slide portions, the disc cartridge having a pair of walls for contacting the first slide portions and holding the inhibit tab in place, and the pair of walls having first notches for engaging with the first projections and holding the write inhibit tab.

It is further and another feature of the present invention to provide a disc cartridge for containing a rotary disc of recording medium and having an open-close shutter for opening and closing the disc cartridge for loading and unloading the rotary disc, and a write inhibit tab slidably provided to indicate by its position writable or nonwritable of the rotary disc, the disc cartridge is comprised of the write inhibit tab having a main body, first slide portions formed respectively on an upper and a lower side ends of the main body, second slide portions formed between the upper and lower slide portions of the first slide portions, first projections having elasticity formed on ends of arms which are extended from the main body, second projections formed on the second slide portions, the disc cartridge having a pair of walls for contacting the first slide portions and holding the write inhibit tab in place, the pair of walls having first notches for engaging with the first projections and holding the write inhibit tab, the open-close shutter having a slot for installing and allowing a movement of the write inhibit tab therein, the open-close shutter also having a pair of elastic slide rails for contacting the second projection and holding the write inhibit tab, and the pair of elastic slide rails having second notches for engaging with the second projections and holding the write inhibit tab.

It is an advantage of the present invention that the write inhibit tab is applicable to both of disc cartridges having an open-close shutter and one having no such shutter, as the write inhibit tab has first and second slide portions and first and second projections, which protect the write inhibit tab from dropping, and further, the write inhibit tab having the first and second slide portions and the projections has a simple form and may be supplied by an automatic feeder, so that a mold therefor is produced easily, as a result, the number of parts is reduced and the material cost and the manufacturing cost are also reduced.

It is another advantage of the present invention that a write inhibit tab of a disc cartridge having an open-close shutter is protected from dropping from a holder when the open-close shutter is open, as the open-close shutter has a slot and an elastic rail thereon for slidably holding the write inhibit tab in the slot.

DETAILED DESCRIPTION OF THE PREFERRED EMBODIMENTS

Figure 1:
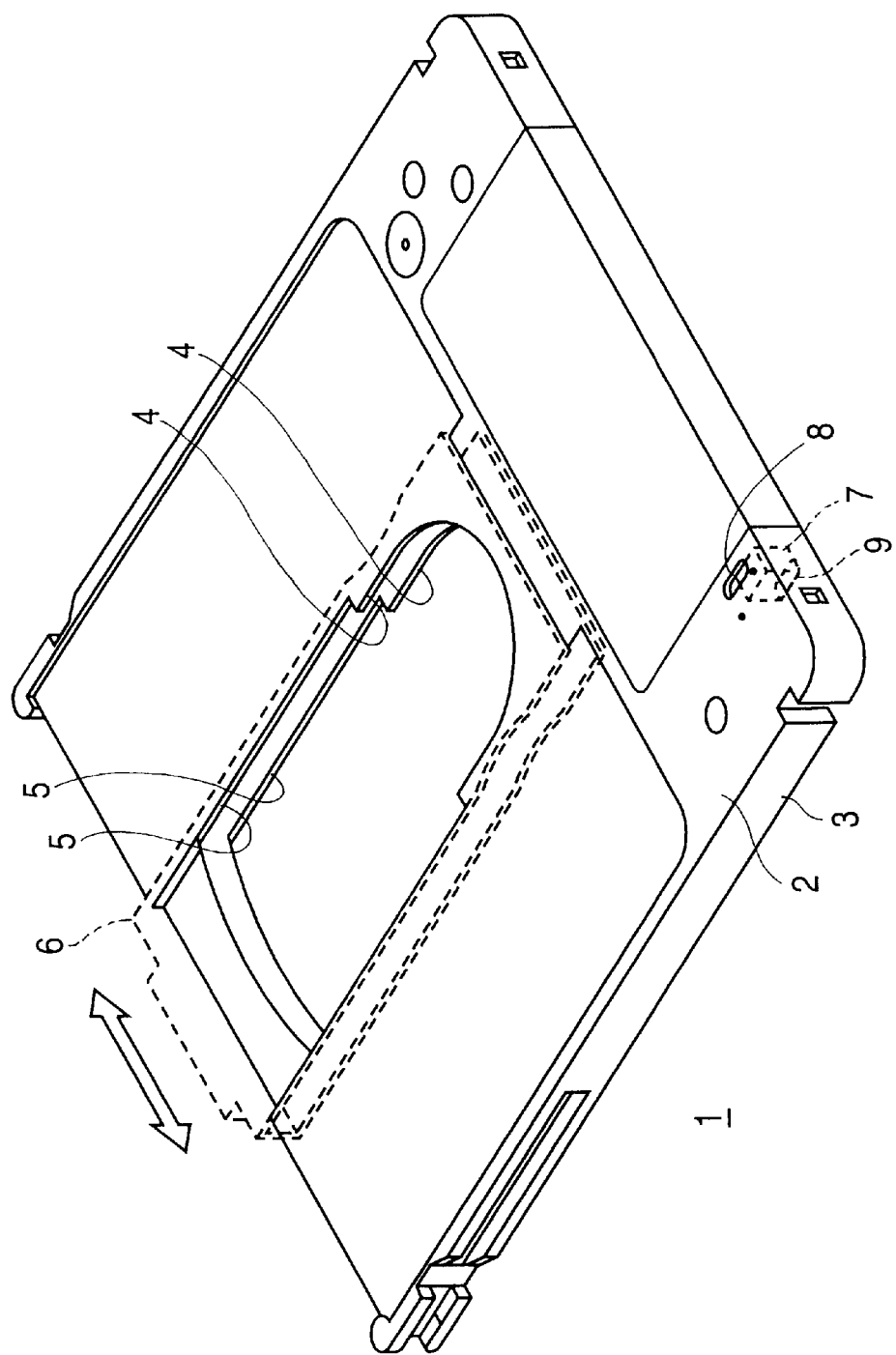
FIG. 1 shows a disc cartridge of an unremovable disc of the prior art.
Figure 2:
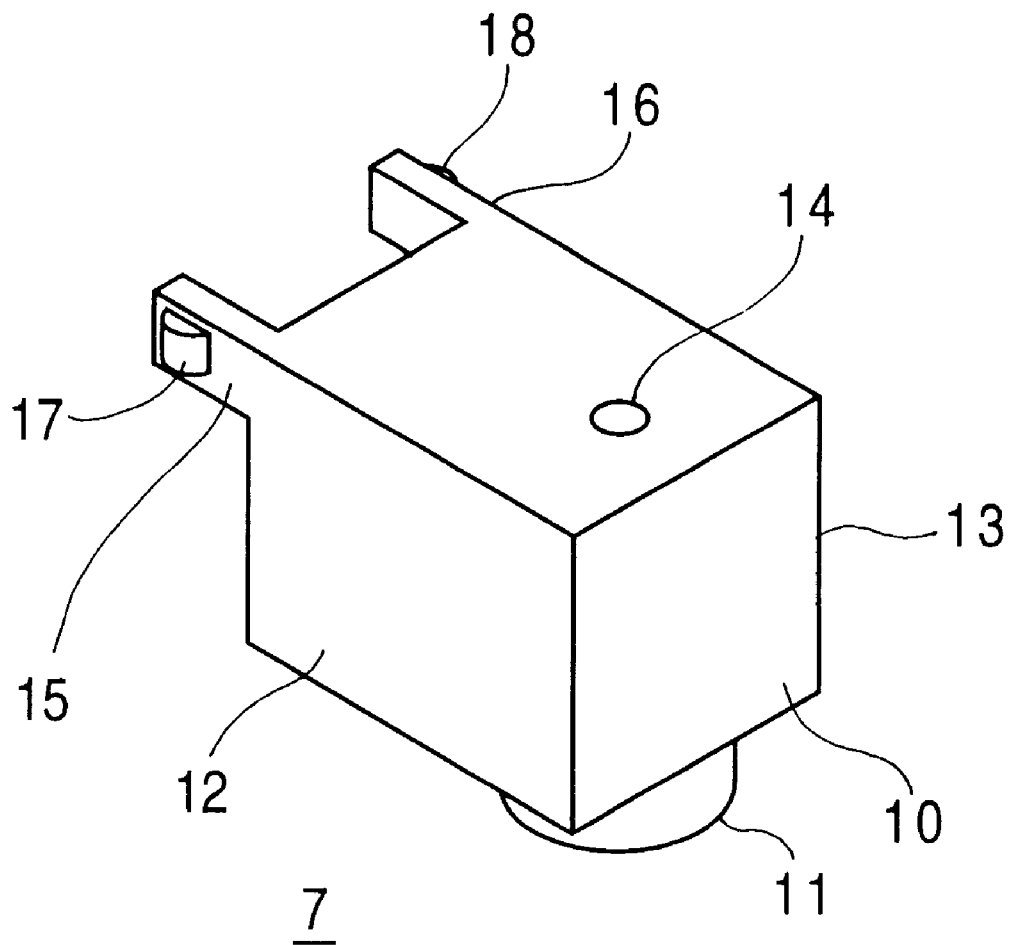
FIG. 2 shows a perspective view of a write inhibit tab of the prior art.
Figure 3:
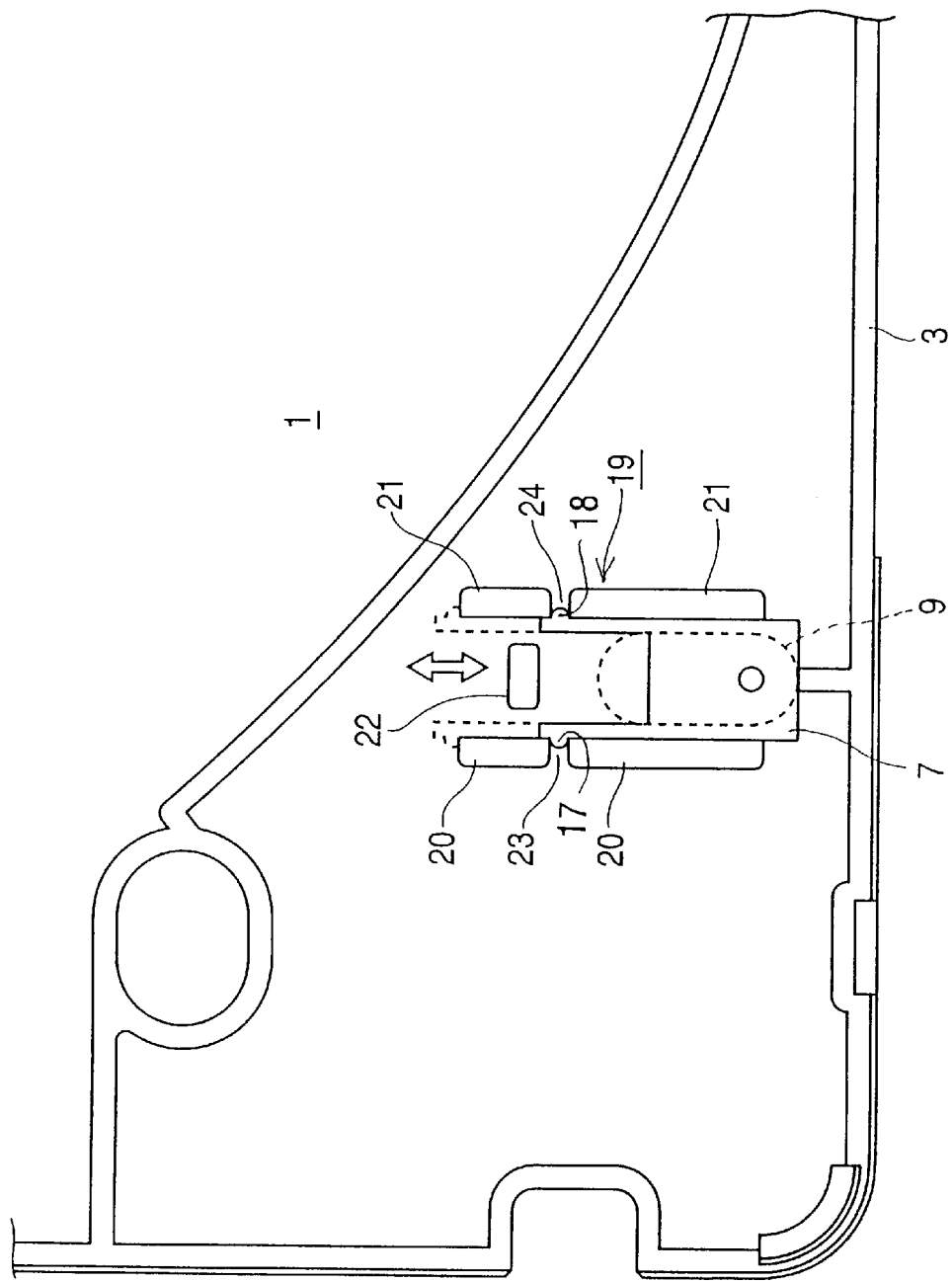
FIG. 3 shows a plan view of a part of a lower case of a disc cartridge of the prior art.
Figure 4:
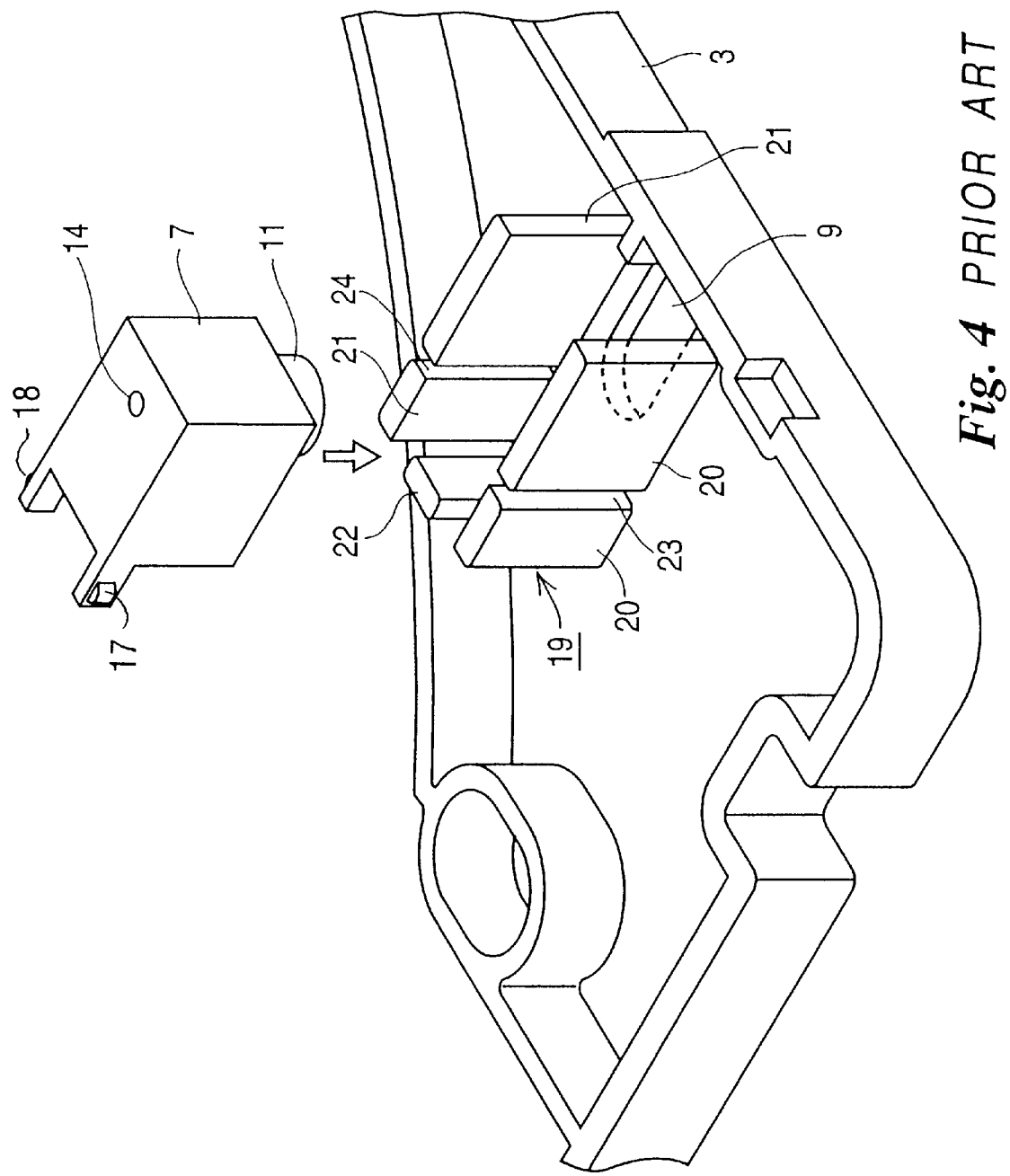
FIG. 4 shows a perspective view of a part of a lower case of a disc cartridge of the prior art.
Figure 5:
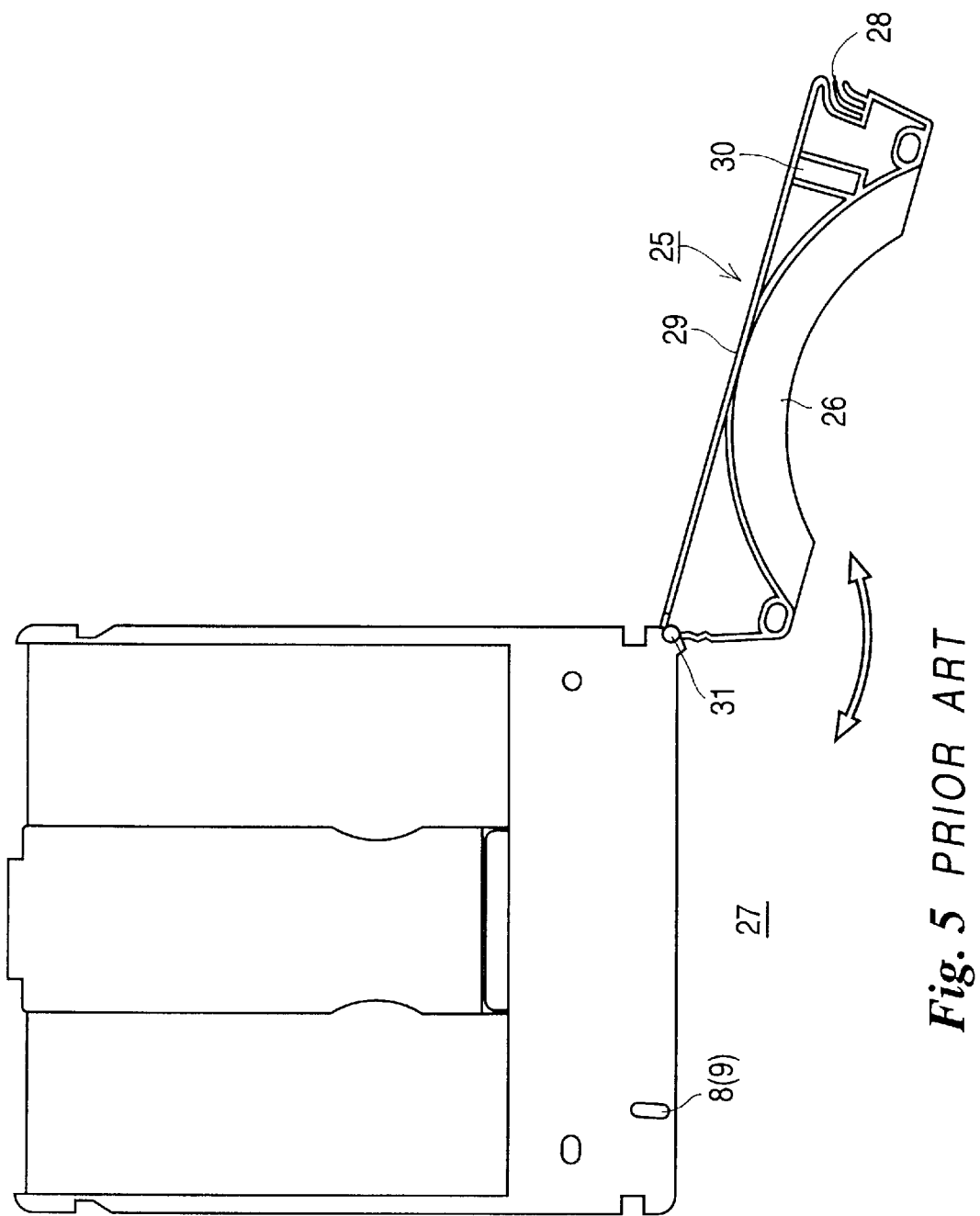
FIG. 5 shows a plan view of a disc cartridge of a removable disc of the prior art.
Figure 6:
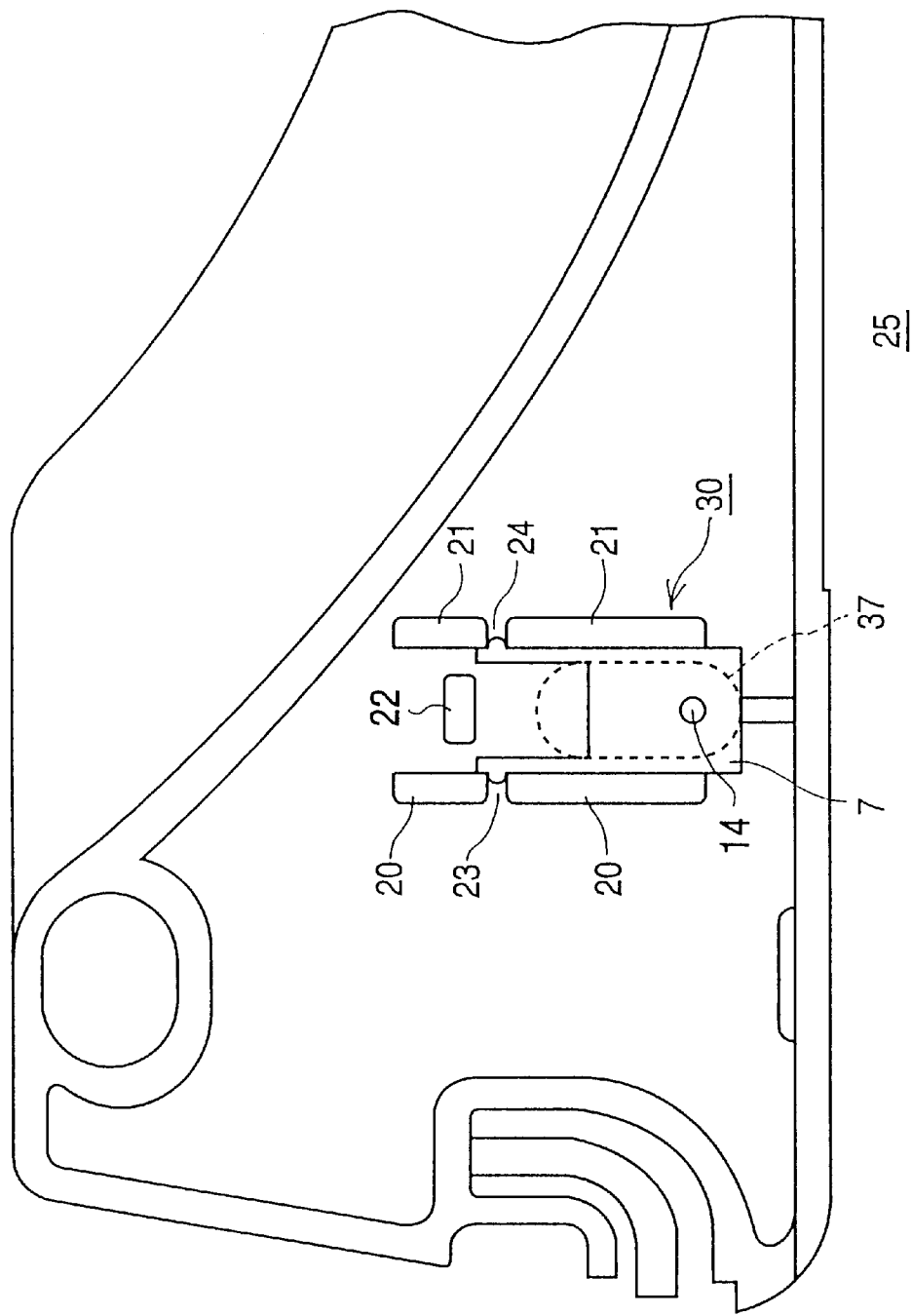
FIG. 6 shows a partial plan view of a open-close shutter of a disc cartridge of a removable disc of the prior art.
Figure 7:
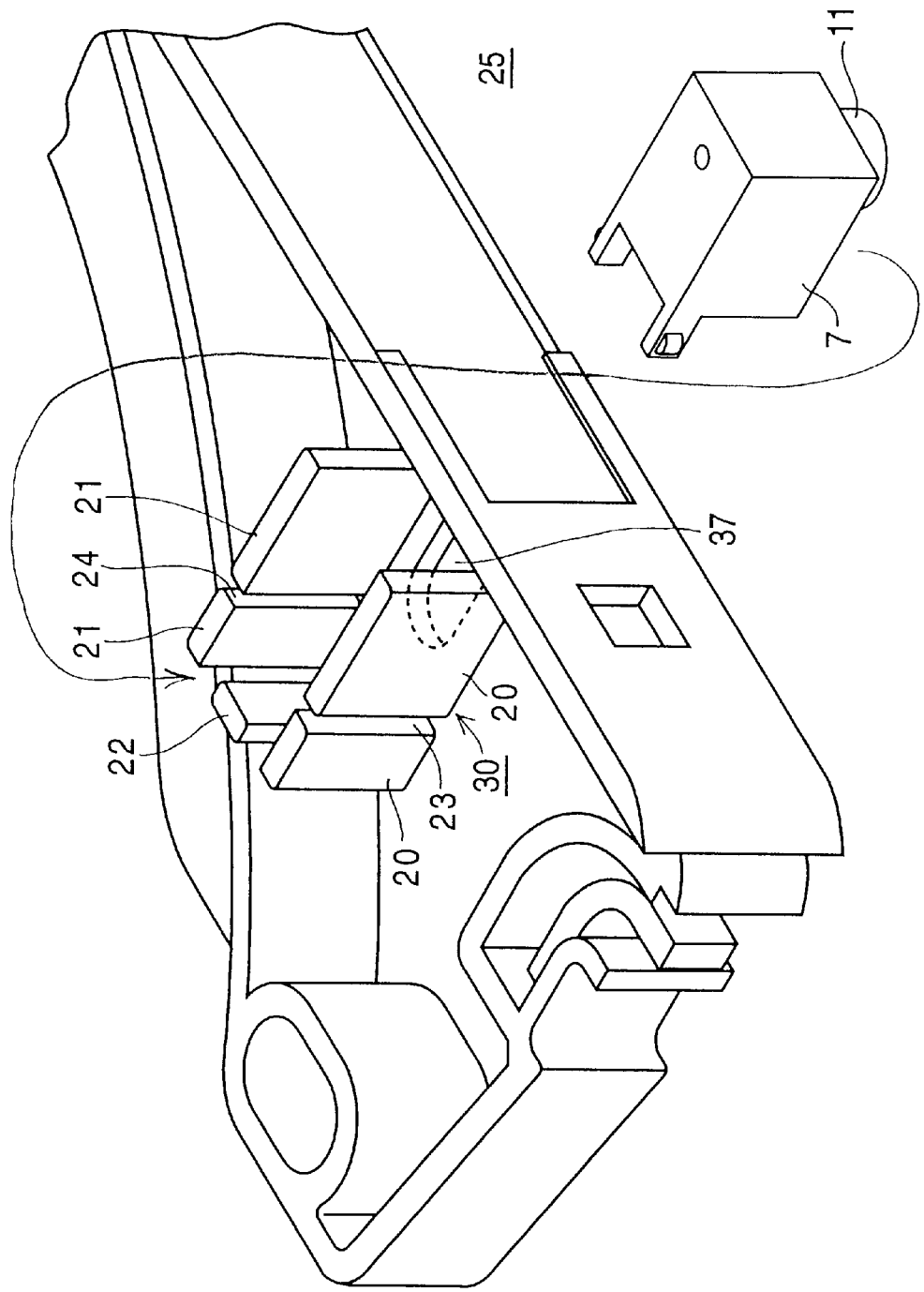
FIG. 7 shows a partial perspective view of a open-close shutter of a disc cartridge of a removable disc of the prior art.

The present invention will now be described in detail with reference to the accompanying drawings in which same reference numerals and symbols are used to denote like or equivalent elements used in the aforementioned prior arts, and detailed explanation of such elements are omitted for simplicity.

[First Embodiment]

Figure 8:
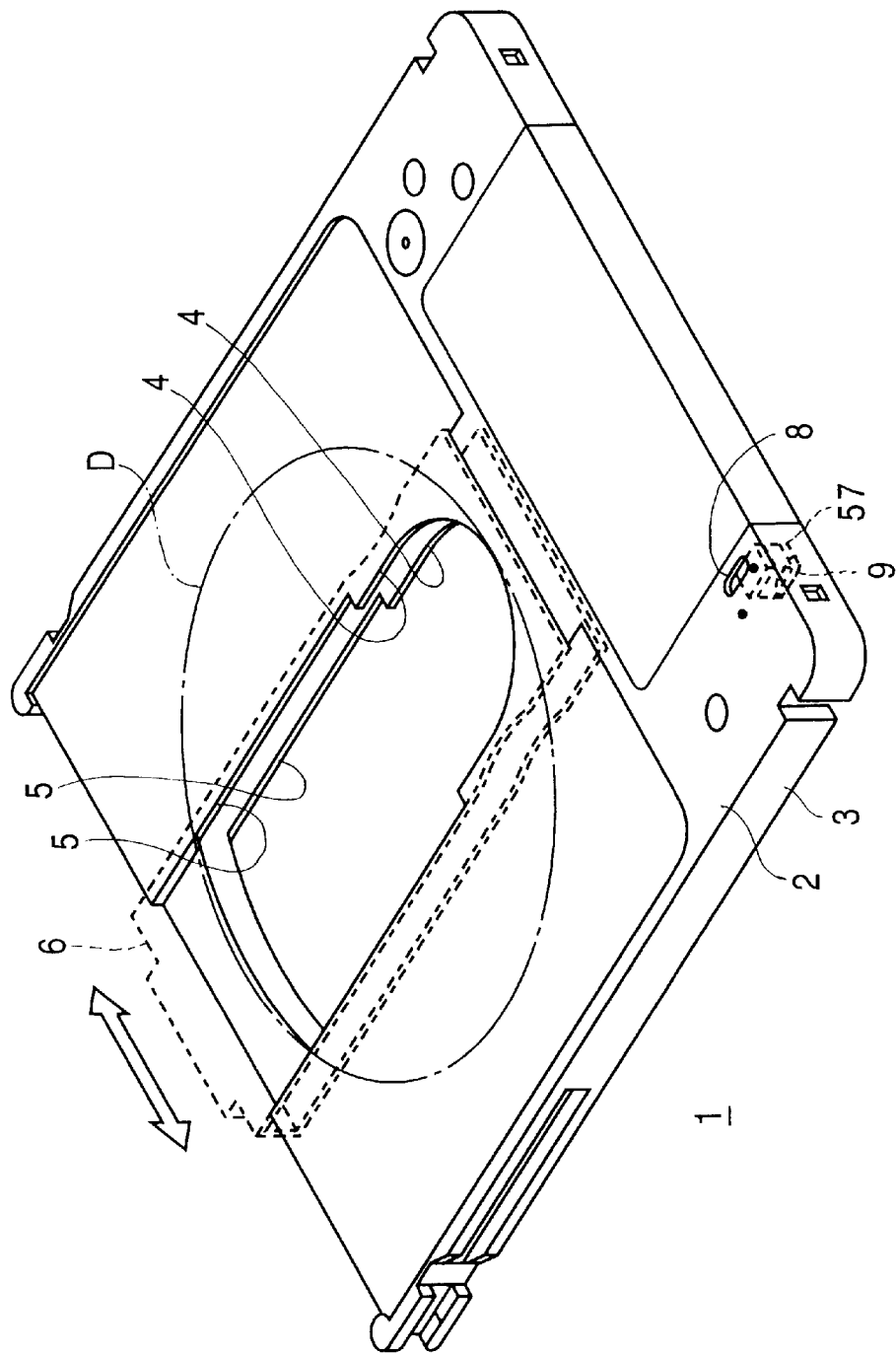
FIG. 8 shows a perspective view of a disc cartridge of first embodiment of an unremovable disc of the present invention.

FIG. 8 shows a perspective view of a disc cartridge of first embodiment of an unremovable disc of the present invention.

Figure 9:
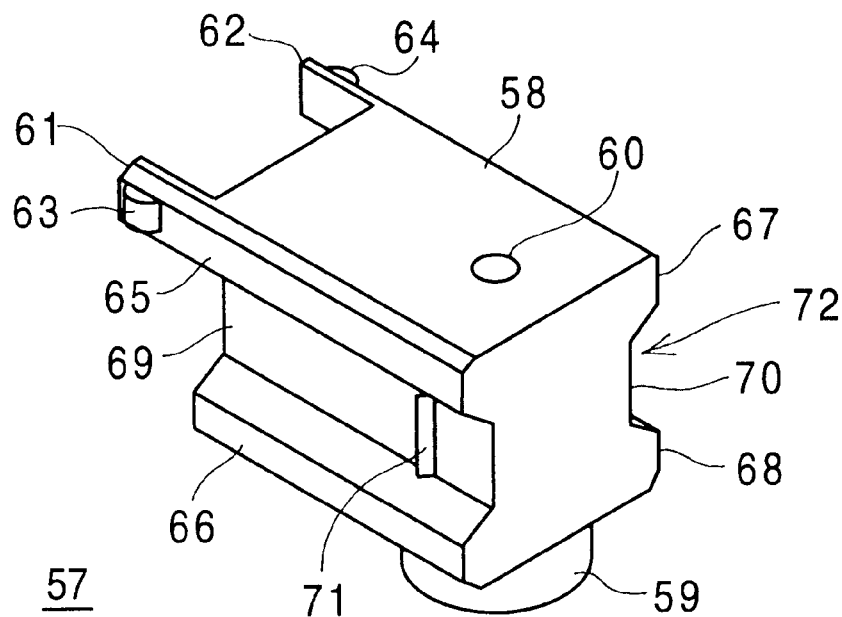
FIG. 9 shows a perspective view of a write inhibit tab of first embodiment of the present invention.

FIG. 9 shows a perspective view of a write inhibit tab of first embodiment of the present invention.

Figure 10:
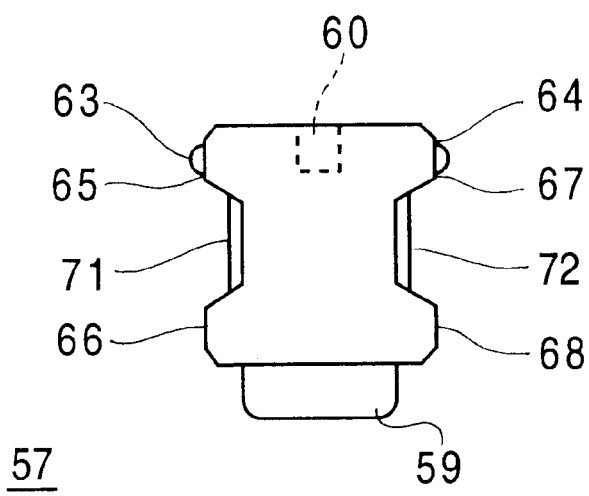
FIG. 10 shows a front view of the write inhibit tab of FIG. 9.

FIG. 10 shows a front view of the write inhibit tab of FIG. 9.

Figure 11:
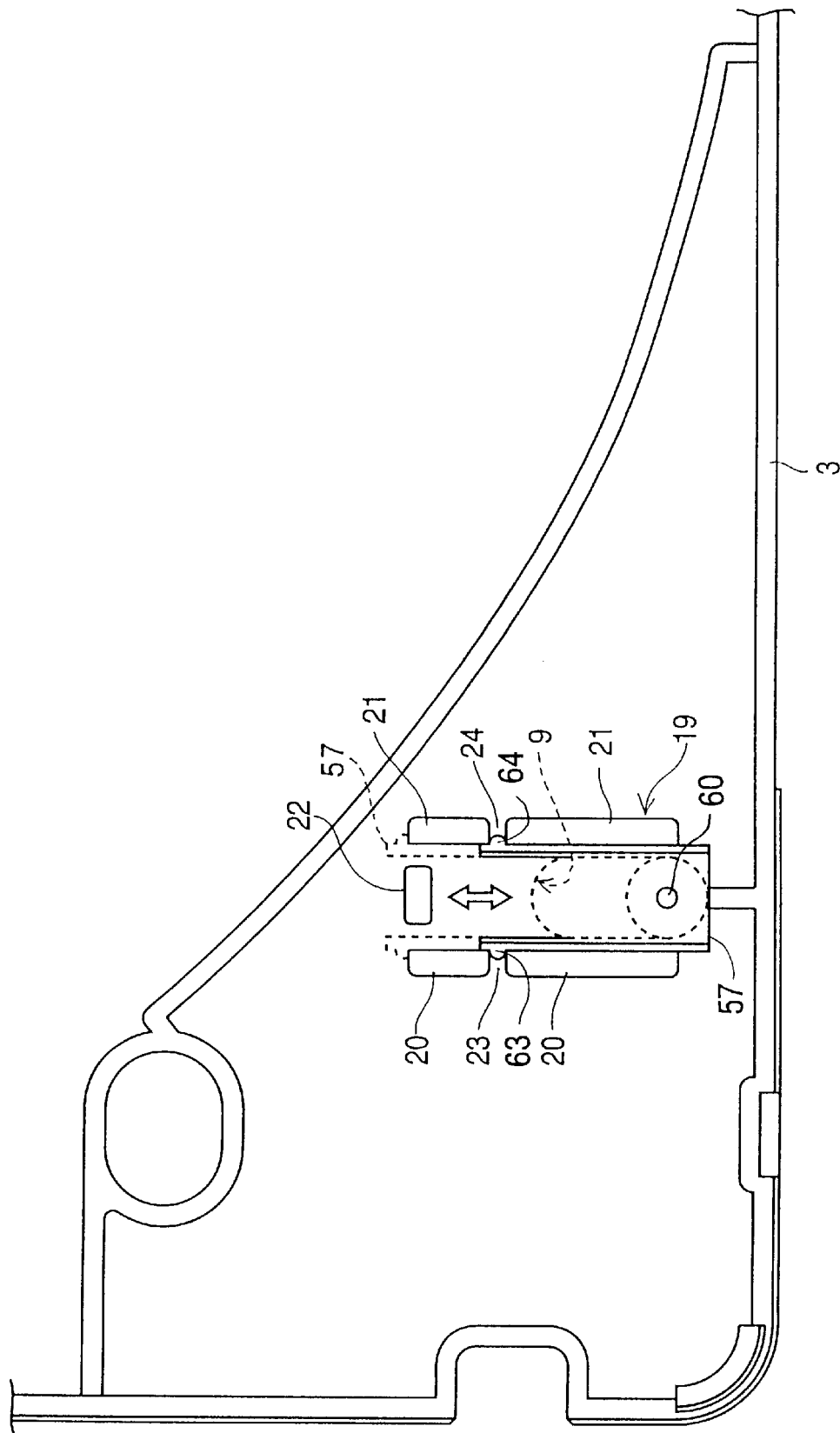
FIG. 11 shows a partial plan view of a lower case of the disc cartridge of FIG. 8.

FIG. 11 shows a partial plan view of a lower case of the disc cartridge of FIG. 8.

Figure 12:
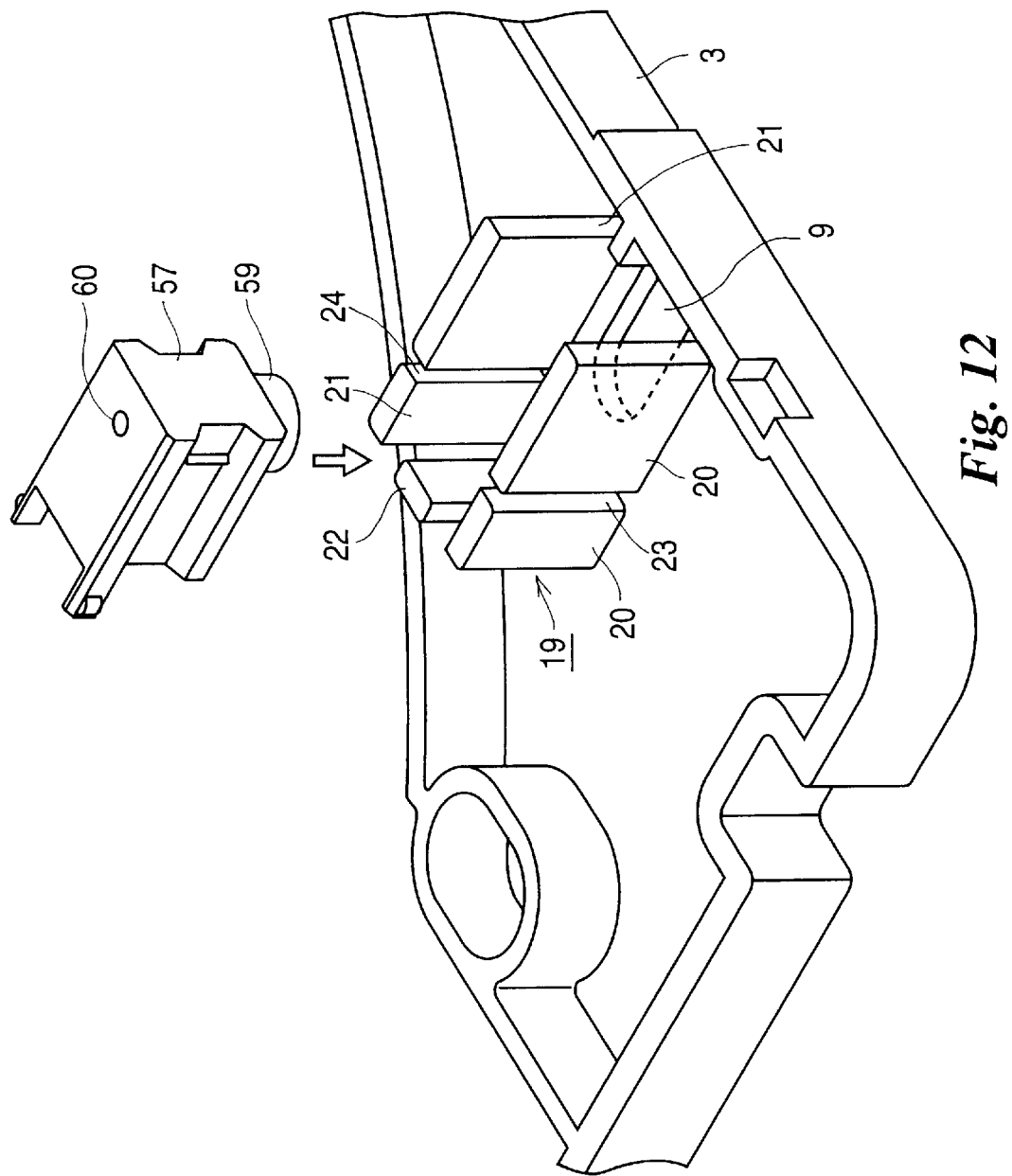
FIG. 12 shows a partial perspective view of a lower case of the disc cartridge of FIG. 8.

FIG. 12 shows a partial perspective view of a lower case of the disc cartridge of FIG. 8.

In FIG. 8, a disc cartridge 1 is comprised of an upper case 2 and lower case 3. The disc cartridge 1 contains a recording medium, such as a rotary disc D. The upper and lower cases 2 and 3 have spindle holes 4, 4 and head windows 5, 5 respectively. When the disc cartridge 1 is not in operation, the spindle holes 4, 4 and the head windows 5, 5 are closed by a shutter 6, which is installed to cover a predetermined area for protecting the disc from dust and a touch. When the disc cartridge is in operation, the shutter 6 is displaced for opening the spindle hole 4, 4 and the head windows 5, 5 in the arrow indicated direction, a center hole of the disc D and a part of the recording medium are exposed.

The disc cartridge 1 of the first embodiment of the present invention has a write inhibit tab 57.

As shown in FIGS. 9 and 10, the write inhibit tab 57 has a main body 58, and a column 59 protruding from a bottom of the main body 58. The main body 58 has a small hole 60 for manually sliding and selecting a position of the write inhibit tab 57 by inserting a pin thereto. First elastic arm 61 and second elastic arm 62 protrude from upper side ends of the main body 58 in parallel with each other. The first and the second elastic arms 61 and 62 have first projections 63, 64 on their distal ends respectively. Moreover, the main body 58 has first slide portions 65, 66, 67 and 68 on upper and lower sides thereof respectively. On one side of the main body 58, second slide portion 69 of groove shape is formed between the first slide portions 65 and 66. On another side of the main body 58, second slide portion 70 of groove shape is formed between the first slide portions 67 and 68. At a fore and aft intermediate position of the second slide portions 69 and 70, second projections 71 and 72 respectively having triangular cross sections are formed vertically.

Figure 13:
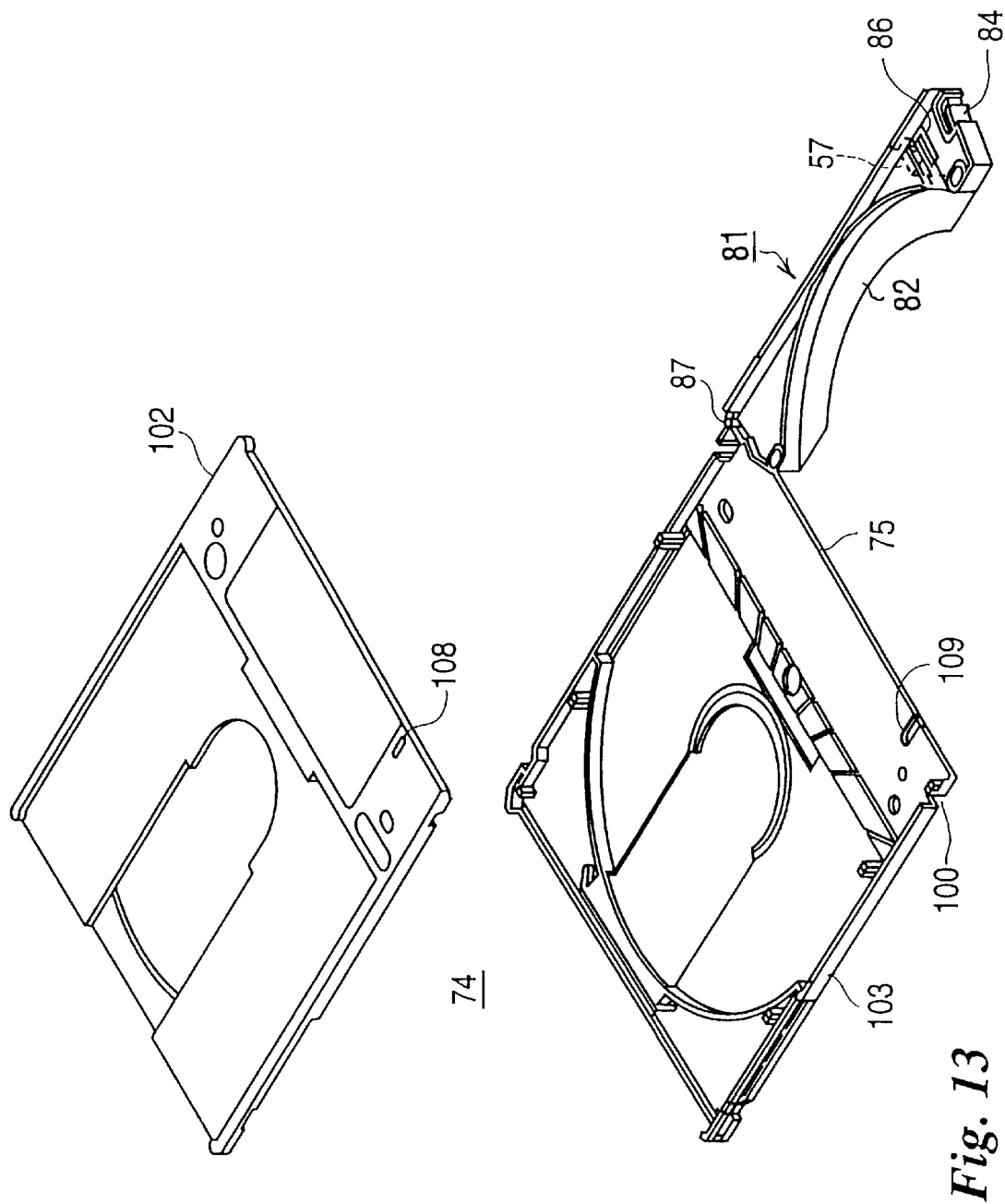
FIG. 13 shows an exploded view of a disc cartridge of a removable disc.

The first slide portions 65 through 68 are for the disc cartridge 1 holding an unremovable disc shown in FIG. 8, and the second slide portions 69 and 70, and the second projections 71 and 72 are for the disc cartridge 74 holding a removable disc shown in FIG. 13.

FIGS. 11 and 12 show partial views of the disc cartridge 1 of an unremovable disc. The lower case 3 bias a holder 19 for installing the write inhibit tab 57 therein. The holder 19 is comprised of first, second and third walls 20, 21, and 22. The first and the second walls 20 and 21 are formed in parallel with each other, and have slits 23 and 24 for engaging with the first projections 63 and 64 of the write inhibit tab 57. The third wall 22 restricts a longitudinal movement of the write inhibit tab 57. The write inhibit tab 57 is installed in the holder 19 from the upper direction thereof, as shown in FIG. 12. Then, the write inhibit tab 57 is held between the upper case 2 and the lower case 3. The column 59 fits in the check hole 9 of elliptical shape provided in the lower case 3, and flushes with an outer surface of the disc cartridge 1.

The upper case 2 has a check hole 8 of elliptical shape, a position of which corresponds with the check hole 9. The position of the write inhibit tab 57 can be displaced manually by inserting a pin into a small hole 60 and moving it through the check hole 8. When the disc cartridge 1 is loaded in a disc drive system, the disc drive system senses the position of the write inhibit tab 57 by a sensing device, such as a photosensor or a mechanical sensor, and discriminates whether data writing on the disc is possible or not. A vertical movement of the write inhibit tab 57 is restricted by the upper and the lower cases 2 and 3.

As mentioned before, when the write inhibit tab 57 is installed in the disc cartridge of an unremovable disc, the second slide portions 69, 70 and the second projections 71, 72 do not function, but the first slide portions 65 through 68 and the first projections 63, 64 function.

The write inhibit tab 57 of the present invention may be applied to the upper case 2 and the lower case 3 having the first, second and third walls 20 through 22 and slits 23, 24, and the check holes 8, 9 of the prior art.

[Second Embodiment]

FIG. 9 shows a perspective view of a write inhibit tab of first embodiment of the present invention.

FIG. 10 shows a front view of the write inhibit tab of FIG. 9.

FIG. 13 shows an exploded view of a disc cartridge of a removable disc.

Figure 14:
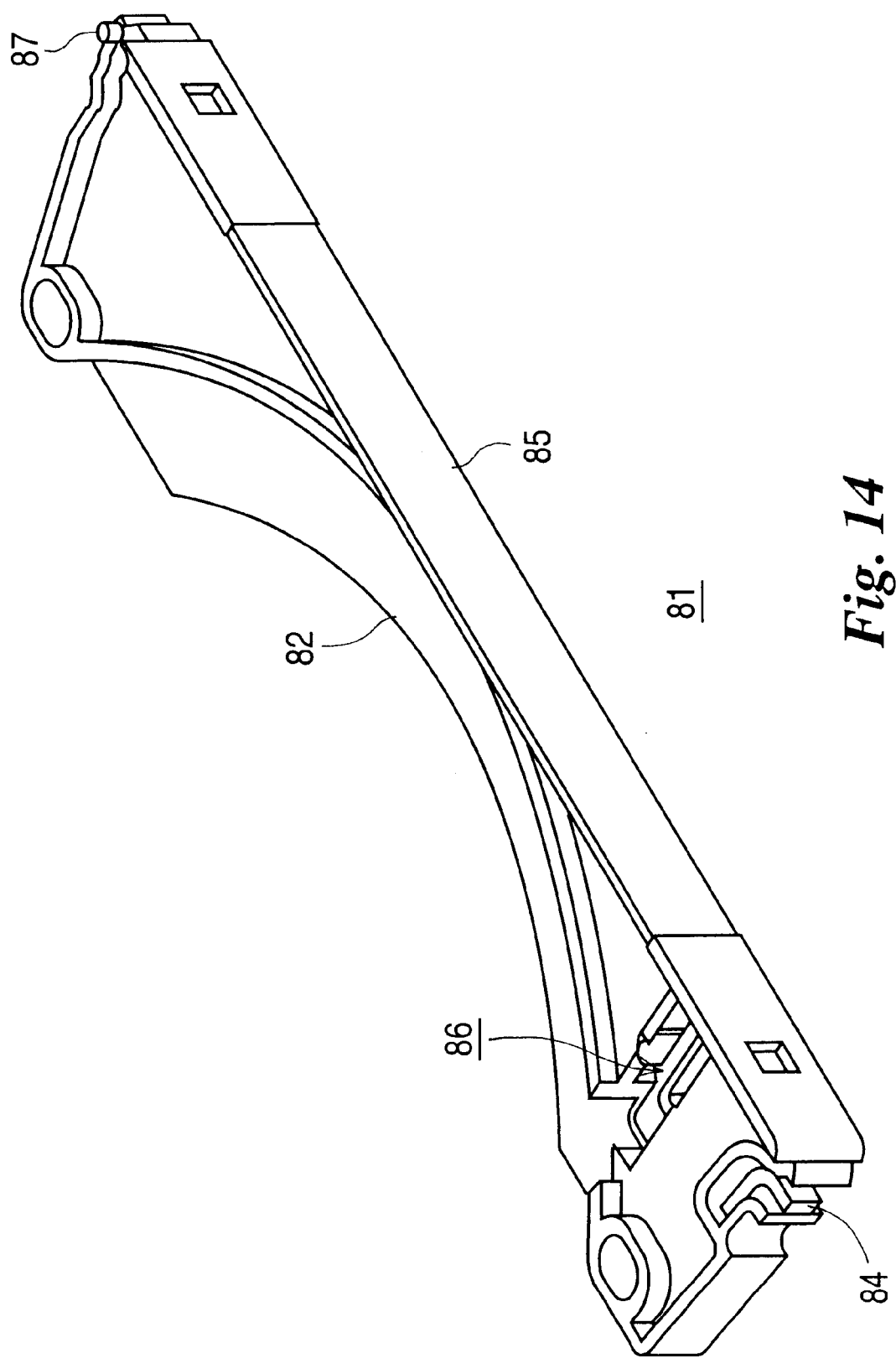
FIG. 14 shows a perspective view of an open-close shutter.

FIG. 14 shows a perspective view of an open-close shutter.

Figure 15:
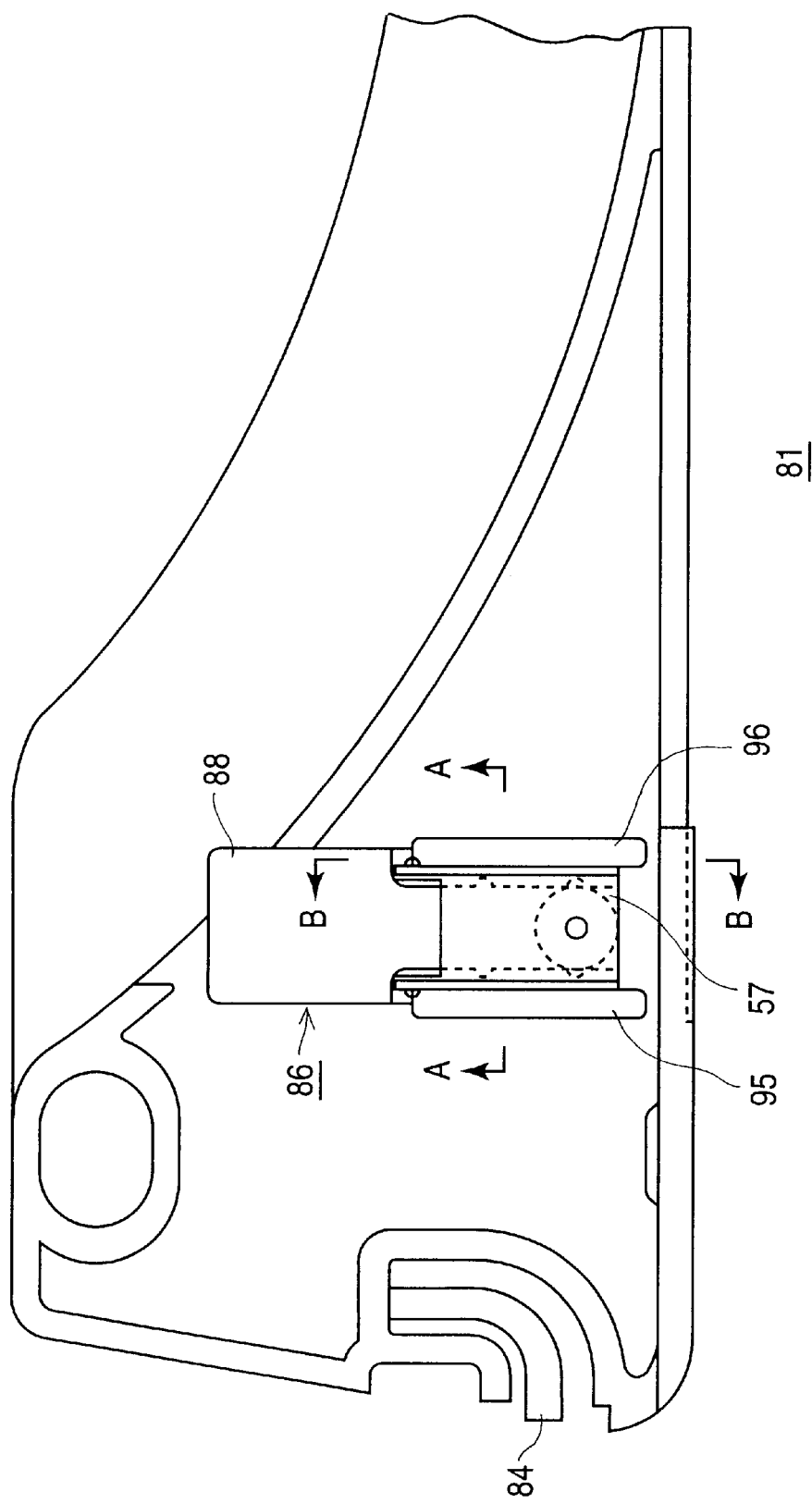
FIG. 15 shows a partial plan view of an open-close shutter having a write inhibit tab.

FIG. 15 shows a partial plan view of an open-close shutter having a write inhibit tab.

Figure 16:
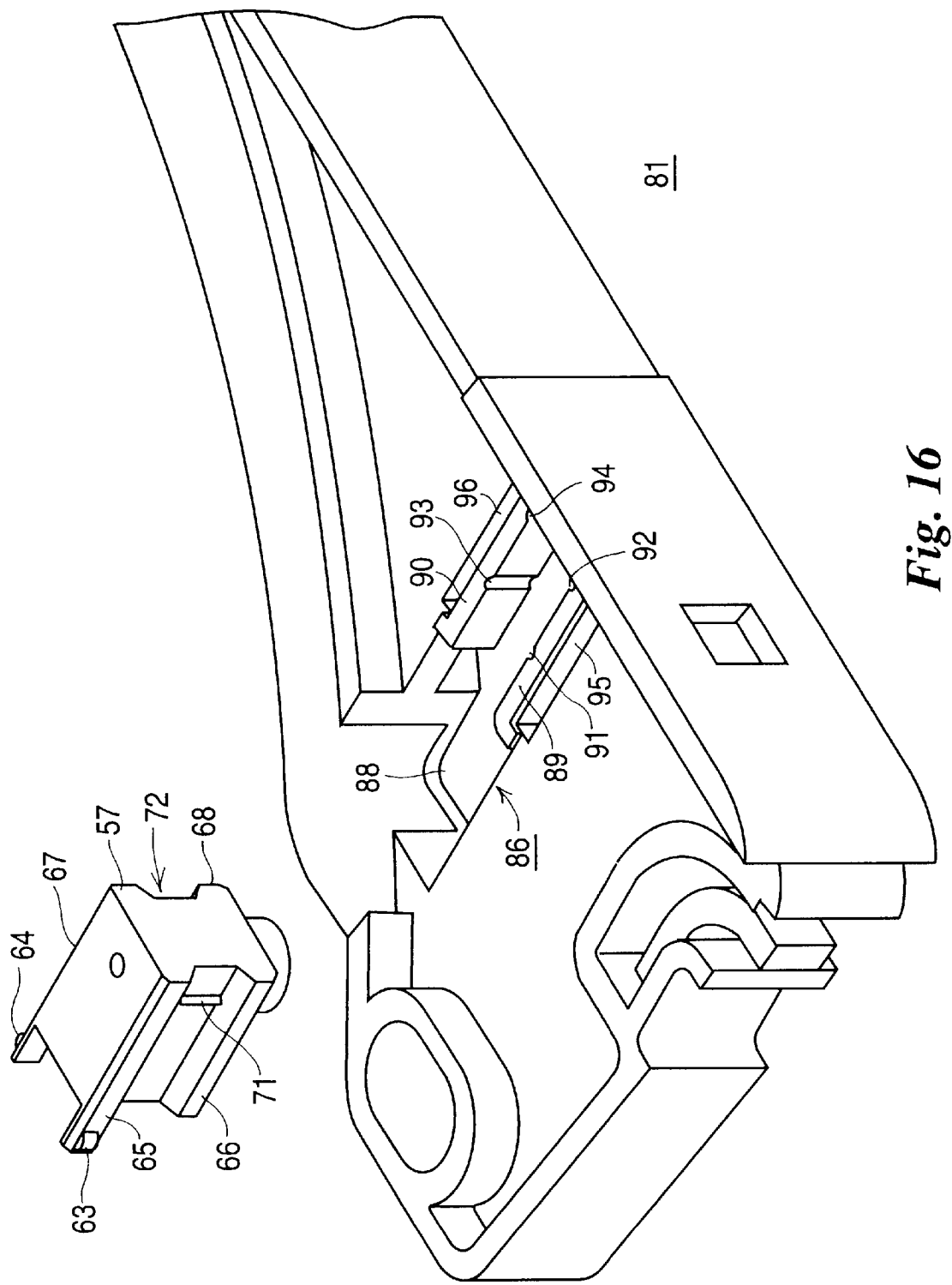
FIG. 16 shows a partial perspective view of an open-close shutter.

FIG. 16 shows a partial perspective view of an open-close shutter.

Figure 17:
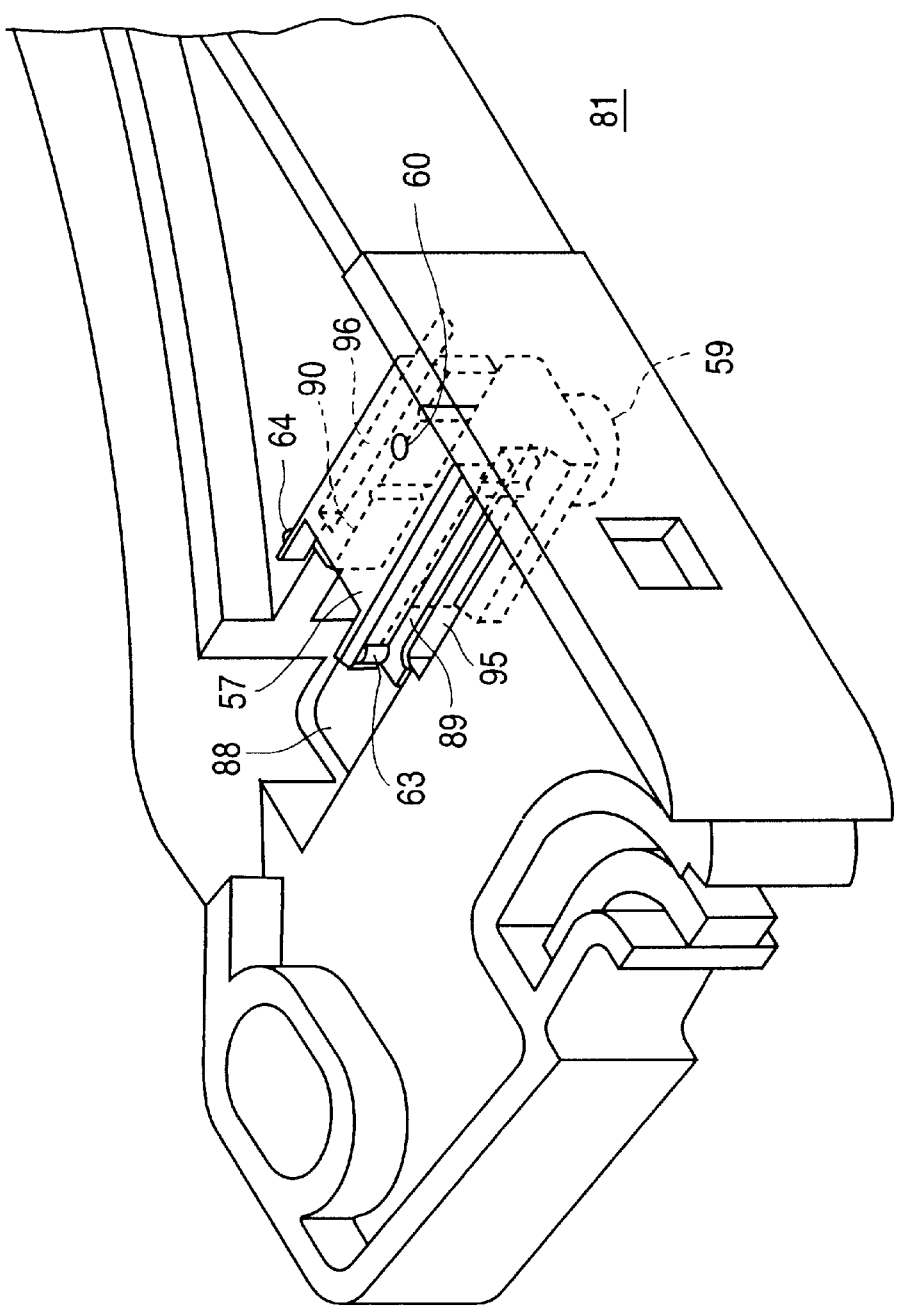
FIG. 17 shows a partial perspective view of an open-close shutter having a write inhibit tab.

FIG. 17 shows a partial perspective view of an open-close shutter having a write inhibit tab.

Figure 18:
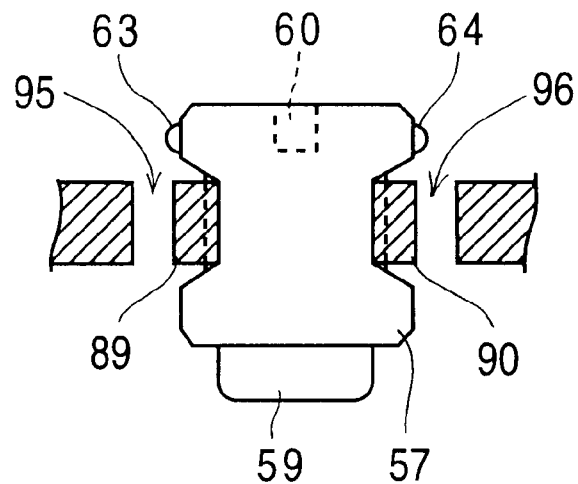
FIG. 18 shows a sectional fragmentary view of A—A of FIG. 15.

FIG. 18 shows a sectional fragmentary view of A—A of FIG. 15.

Figure 19:
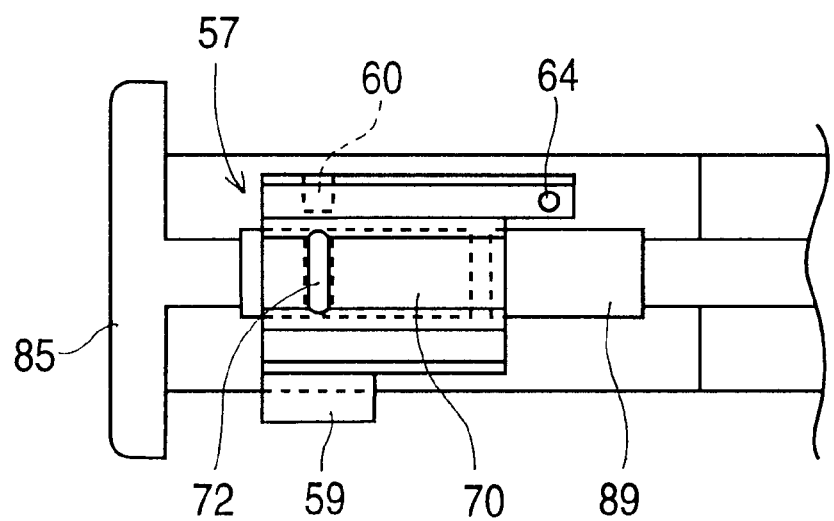
FIG. 19 shows a sectional fragmentary view of B—B of FIG. 15.

FIG. 19 shows a sectional fragmentary view of B—B of FIG. 15.

Figure 20:
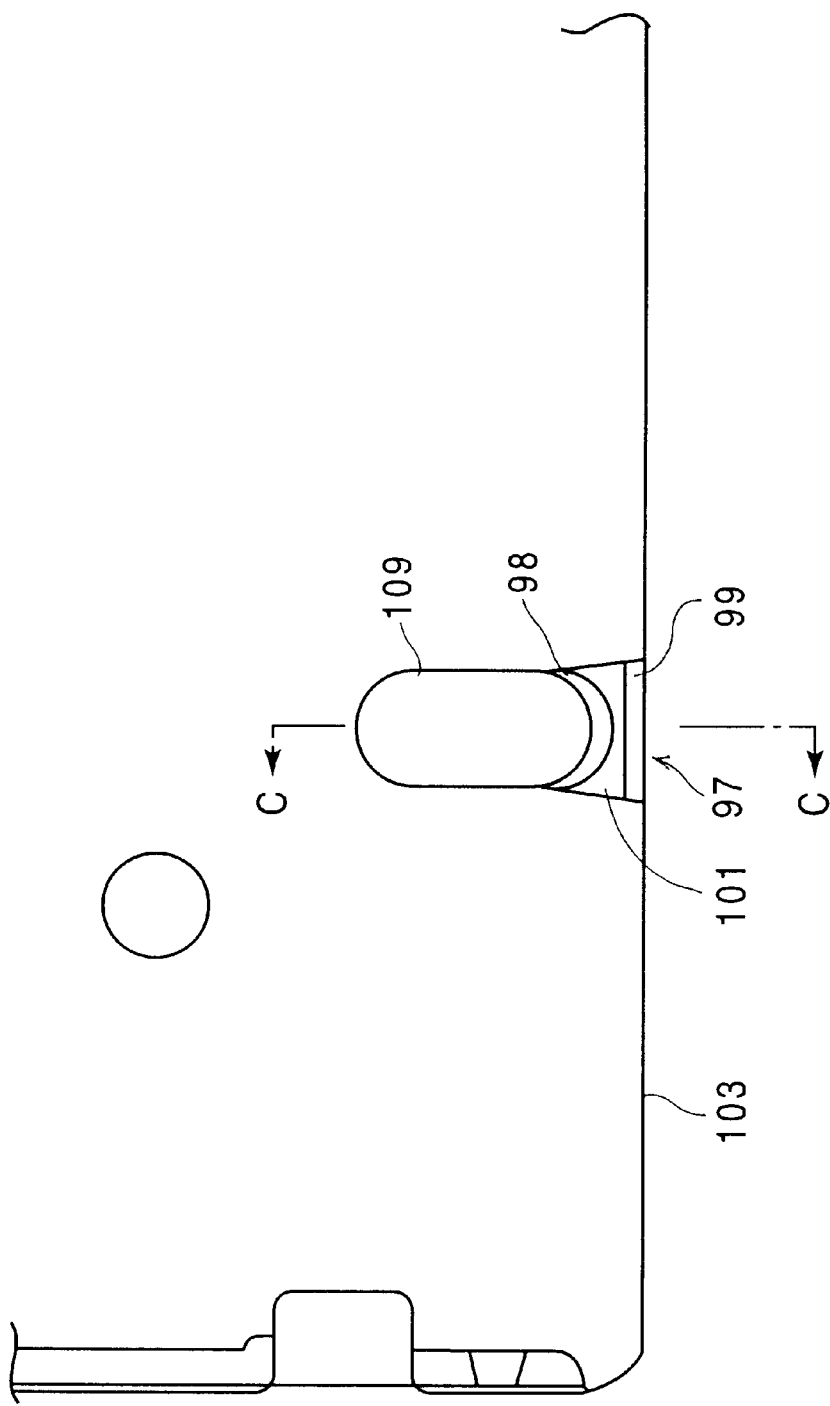
FIG. 20 shows a partial plan view of a lower case of a disc cartridge.

FIG. 20 shows a partial plan view of a lower case of a disc cartridge.

Figure 21:
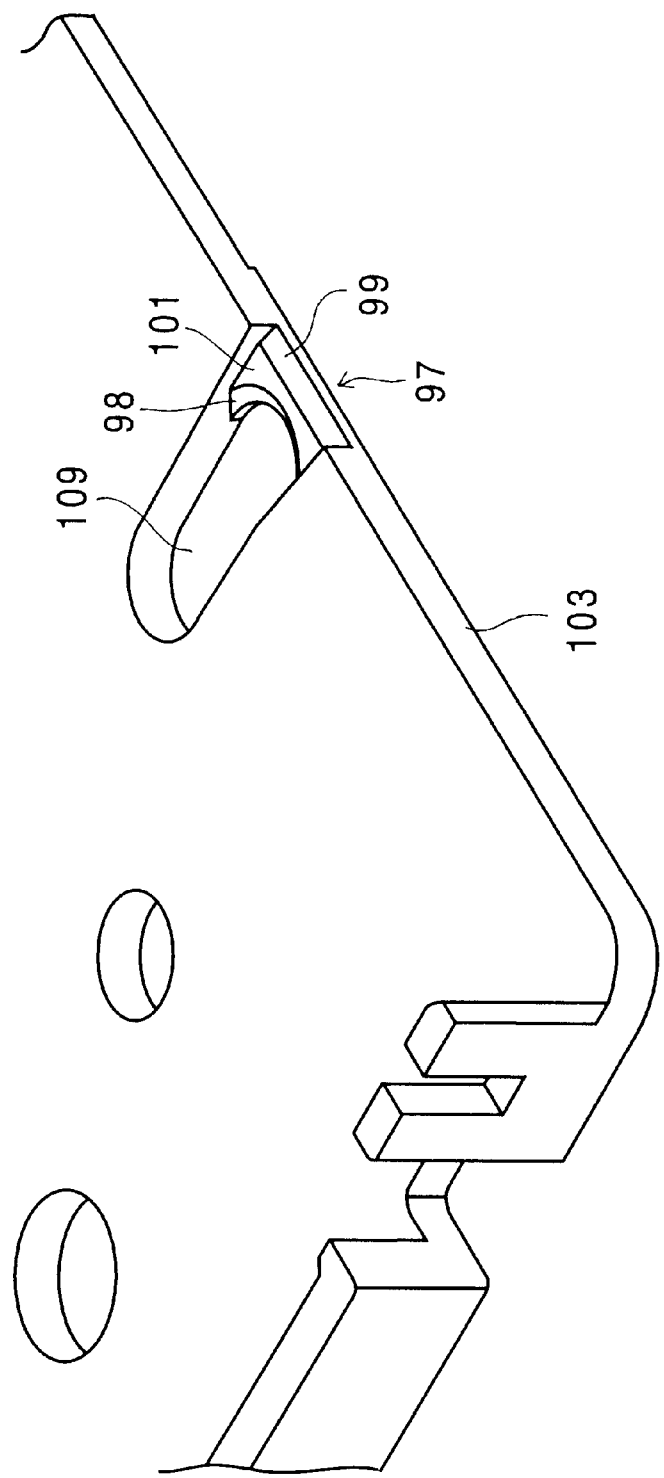
FIG. 21 shows a partial perspective view of a lower case of a disc cartridge.

FIG. 21 shows a partial perspective view of a lower case of a disc cartridge.

Figure 22:
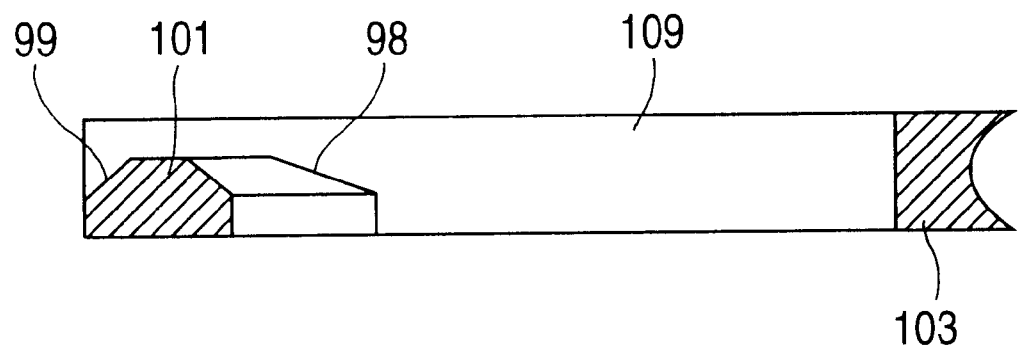
FIG. 22 shows a sectional fragmentary view of C—C of FIG. 20.

FIG. 22 shows a sectional fragmentary view of C—C of FIG. 20.

In this second embodiment, a write inhibit tab 57 shown in FIGS. 9 and 10 is used.

As shown in FIG. 13, a disc cartridge 74 has an upper case 102 and a lower case 103. The upper and lower case 102, 103 have spindle holes, head windows, an open-close shutter 81, and check holes 108, 109 respectively. The disc cartridge 74 has an open end 75 for loading and unloading a disc. The open-close shutter 81 is rotatably held in the disc cartridge 74. The open-close shutter 81 has a holder 86 for installing the write inhibit tab 57.

As shown in FIG. 14, the open-close shutter 81 has a support portion 82 of an arched shape for supporting a part of an edge of a disc, an elastic protrusion 84 for engaging the open-close shutter 81 with a body of the disc cartridge 74, a front cover 85, the holder 86 for installing the write inhibit tab 57. The open-close shutter 81 has a hinge 87 on its end for being supported by the disc cartridge 74, which allows the open-close shutter 81 to open or close. When the open-close shutter 81 is closed, most of the open-close shutter 81 is contained in the disc cartridge 74 except the front cover 85.

As shown in FIG. 16, the holder 86 has a slot 88 for installing and allowing the write inhibit tab 57 to slide, and elastic slide rails 89, 90 formed on the edges of the slot 88. The elastic slide rails 89 and 90 have a first pair of notches 91, 93 and a second pair of notches 92, 94 extending vertically thereon respectively. The holder 86 has holes 95, 96 near the elastic slide rails 89, 90 respectively for giving elasticity to the elastic slide rails 89, 90.

The write inhibit tab 57, as shown in FIG. 17, is installed in the slot 88 and held by the elastic slide rails 89, 90. The second slide portions 69, 70 of the write inhibit tab 57 contact the elastic slide rails 89, 90, and then, the first slide portions 65 through 68 restrict the vertical movement of the write inhibit tab 57. One of the first pair of notches 91, 93 and the second pair of notches 92, 94 selectively engage with the second projections 71, 72. By this engagement, the position of the write inhibit tab 57 is determined. The elasticity of the elastic slide rails 89, 90 hold the write inhibit tab 57 securely, which is introduced by the holes 95, 96 provided near thereof, as shown in FIG. 18.

When the open-close shutter 81 is contained into the disc cartridge 74, the write inhibit tab 57 is also contained thereto.

When the open-close shutter 81 is opened or closed, the column 59 may collide with the open end 75 of the disc cartridge 74, and may disturb the movement of the open-close shutter 81. To solve this problem, as shown in FIGS. 20 and 22, an extension 97 of the check hole 109 has tapered edges 99 and 98 on its outside and inside respectively. There is a flat surface 101 provided between the tapered edges 98 and 99. When the open-close shutter 81 is closed, the column 59 meets with the tapered edge 99, then moves along a sloped surface of the tapered edge 99 pressing resiliently downward the extension 97. When the open-close shutter 81 is opened, the column 59 meets with the tapered edge 98, then moves along a sloped surface of the tapered edge 98 pressing downward the extension 97. Thus, the open-close shutter 81 may be moved easily and smoothly. Moreover, the extension 97 is free from cracking as the thickness of the extension 97 is secured by providing the tapered edges 98 and 99.

In particular, as shown in FIG. 20, the shape of the extension 97 is sectorial, which widens outward. When the open-close shutter 81 is moved around the hinge 87 for closing, as shown in FIG. 13, the column 59 contacts the tape edge 99, whose widened edge guides the column 59 to the check hole 109 smoothly. When the open-close shutter 81 is opened, the column 59 meets with the tapered edge 98 and is guided to the outside of the extension 97 smoothly as the extension 97 is widened. Thus, the open-close shutter 81 is opened or closed without giving an excessive stress to the disc cartridge 74. As shown in FIG. 13, the lower case 103 of the disc cartridge 74 has a hole 100 for releasing engagement of the open-close shutter 81 with the elastic protrusion 84 of the lower case 103 by inserting a pin thereto.

An employment of the write inhibit tab 57 of the disc cartridge 74 having the open-close shutter 81 is the same as that of the disc cartridge 1 of an unremovable disc. The column 59 fits in the check hole 109 of the lower case 103. A pin is inserted in the small hole 60 of the write inhibit tab 57 through the check hole 108 of the upper case 102, and moves manually the write inhibit tab 57 to a selected position. When the disc cartridge 74 is installed in a drive system, the drive system detects the position of the write inhibit tab by a device such as a photosensor, and detects whether the disc is writable or nonwritable.

When the open-close shutter 81 is open, the write inhibit tab 57 is held in place by the elastic slide rails 89, 90, thus it does not change its position, or not drop therefrom.

As mentioned before, the write inhibit tab 57 of the present invention may be applied to either of the disc cartridge of a removable disc or that of an unremovable disc, which leads to save a number of parts for producing a disc cartridge.

In these embodiments, explanations are limited to a disc cartridge for single sided discs, but the write inhibit tab of the present invention can be applied to a disc cartridge for double sided discs. In the disc cartridge for double sided discs, two of the write inhibit tab of the present invention are formed on both sides thereof.

As mentioned in above explanations, the write inhibit tab of the present invention has many advantages.

One of the advantages of the present invention is that the write inhibit tab of the present invention may be applied to either of the disc cartridge of a removable disc or that of an unremovable disc as the write inhibit tab has two pairs of slide portions and projections, and may be installed in any of the open-close shutter and the disc cartridge itself.

Another advantage of the present invention is that the number of the parts constituting the disc cartridge is minimum and production thereof may be easy as a mold therefor is easily made, and parts feeding in production is easy for the reason of the simple profile of the write inhibit tab.

Further and another advantage of the present invention is that the write inhibit tab is protected from dropping from the disc cartridge as the write inhibit tab is held by the elastic force of the elastic slide rails which are formed on the edges of the slot formed on the open-close shutter.

Still another advantage of the present invention is that the position of the write inhibit tab is kept from moving by itself.

Still further advantage of the present invention is that the edge of the open end of the disc cartridge is kept from cracking as the extension of the check hole has tapered edges.

Still further and another advantage of the present invention is that the write inhibit tab may be retrofitted to the disc cartridge of the prior art.

What is claimed is:

1. A write inhibit tab for a disc cartridge for indicating writable and nonwritable statuses of a disc held within said disc cartridge, said statuses being represented by a position of said write inhibit tab in said disc cartridge, said write inhibit tab comprising:
   a main body;
   a pair of upper and lower slide means formed respectively on upper and lower side ends of said main body;
   a pair of groove shaped intermediate slide means formed between said upper and lower slide means;
   a pair of elastic arm means protruding from at least one of said upper and lower side ends of the main body and having a pair of first engaging means provided on distal ends of said pair of elastic arm means; and
   a pair of second engaging means provided on said intermediate slide means.

2. The write inhibit tab claimed in claim 1, wherein said upper and lower slide means and said first engaging means are used in a disc cartridge of an unremovable disc, and said intermediate slide means and said second engaging means are used in a disc cartridge of a removable disc.

3. A disc cartridge comprising a write inhibit tab for indicating writable and nonwritable statuses of a rotary disc held within said disc cartridge, said statuses being represented by a position of said write inhibit tab in said disc cartridge, said write inhibit tab being comprised of a main body, upper and lower slide means formed respectively on upper and lower side ends of said main body, intermediate slide means formed between said upper and lower slide means, elastic arms means protruding from at least one of said upper and lower side ends of the main body and having first engaging means provided on a distal end of said elastic arm means, and second engaging means provided on said intermediate slide means, said disc cartridge further comprising:

- an open-close shutter for loading and unloading said rotary disc in and from a body of said disc cartridge;
- a slot defined in said open-close shutter for slidably installing said write inhibit tab;
- a pair of elastic slide rail means formed on edges of said slot for slidably holding said intermediate slide means; and
- notch means formed on said pair of elastic slide rails for engaging with said second engaging means.

4. The disc cartridge claimed in claim 3, wherein said disc cartridge has a check hole for observing said position, and tapered edges for smoothly opening and closing said open-close shutter.

5. A disc cartridge comprising a write inhibit tab for indicating writable and nonwritable statuses of a rotary disc held within said disc cartridge, said statuses being represented by a position of said write inhibit tab in said disc cartridge, said write inhibit tab being comprised of a main body, a pair of upper and lower slide means formed respectively on upper and lower side ends of said main body, a pair of groove shaped intermediate slide means formed between said upper and lower slide means, a pair of elastic arm means protruding from at least one of said upper and lower side ends of the main body and having a pair of first engaging means provided on distal end of said pair of elastic arm means, and a pair of second engaging means provided on said intermediate slide means, said disc cartridge further comprising:

- a pair of wall means for contacting slidably said upper and lower slide means so as to hold said write inhibit tab; and
- slit means provided on said pair of wall means for engaging with said first engaging means for holding said write inhibit tab.

* * * * *